United States Patent [19]

Sparer et al.

[11] Patent Number: 4,642,655
[45] Date of Patent: Feb. 10, 1987

[54] COLOR-INDEXED DYE FRAMES IN THERMAL PRINTERS

[75] Inventors: Steven J. Sparer, Rochester; Stanley W. Stephenson, Spencerport, both of N.Y.

[73] Assignee: Eastman Kodak Company, Rochester, N.Y.

[21] Appl. No.: 851,748

[22] Filed: Apr. 14, 1986

[51] Int. Cl.[4] .......................... G01D 15/10; B41J 3/10
[52] U.S. Cl. ................................ 346/76 PH; 400/120; 400/224.2; 400/240.3
[58] Field of Search ................. 346/76 PH; 400/120, 400/224.2, 240.3

[56] References Cited

U.S. PATENT DOCUMENTS

| | | | |
|---|---|---|---|
| 4,551,729 | 11/1985 | Kubo et al. | 346/1.1 |
| 4,573,059 | 2/1986 | Shimma et al. | 346/76 PH |
| 4,590,490 | 5/1986 | Takanashi et al. | 346/76 PH |

Primary Examiner—E. A. Goldberg
Assistant Examiner—Gerald E. Preston
Attorney, Agent, or Firm—Raymond L. Owens

[57] ABSTRACT

A carrier which can be used in a thermal printer includes a repeating series of spaced yellow, magenta and cyan dye frames having clear interframe areas disposed between dye frames. A cyan code patch is disposed in a portion of the clear interframe between a yellow frame or a series and the cyan frame of the preceding series which permits the identification of the yellow frame of this series.

6 Claims, 4 Drawing Figures

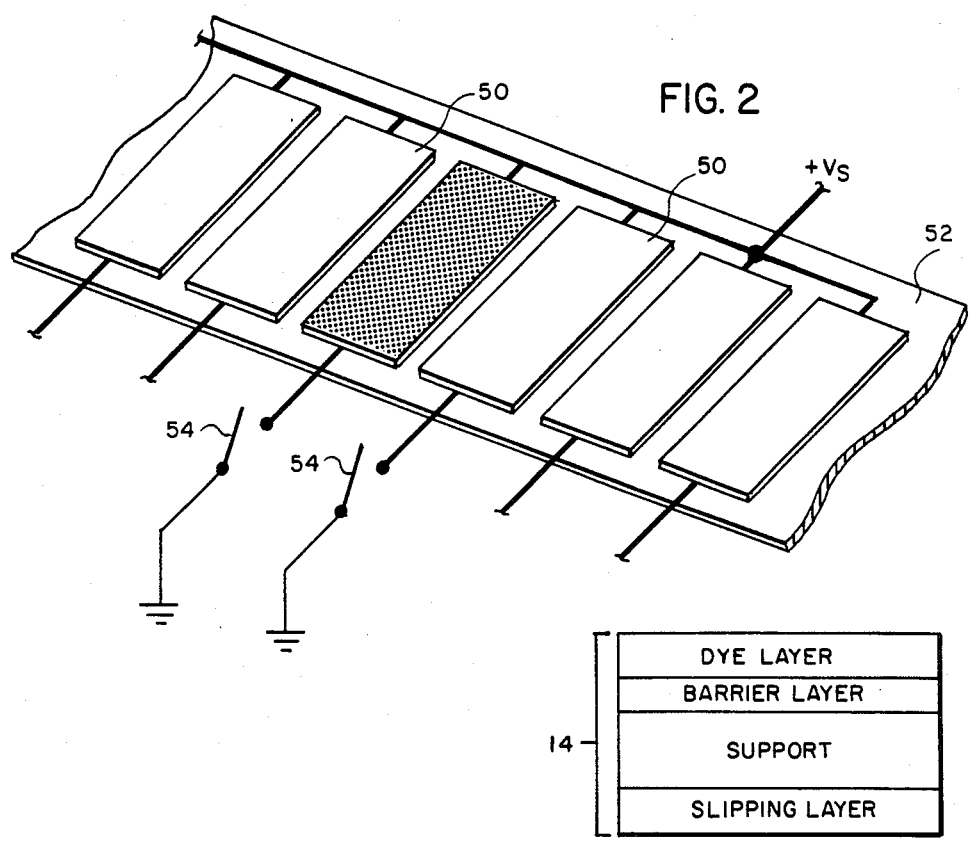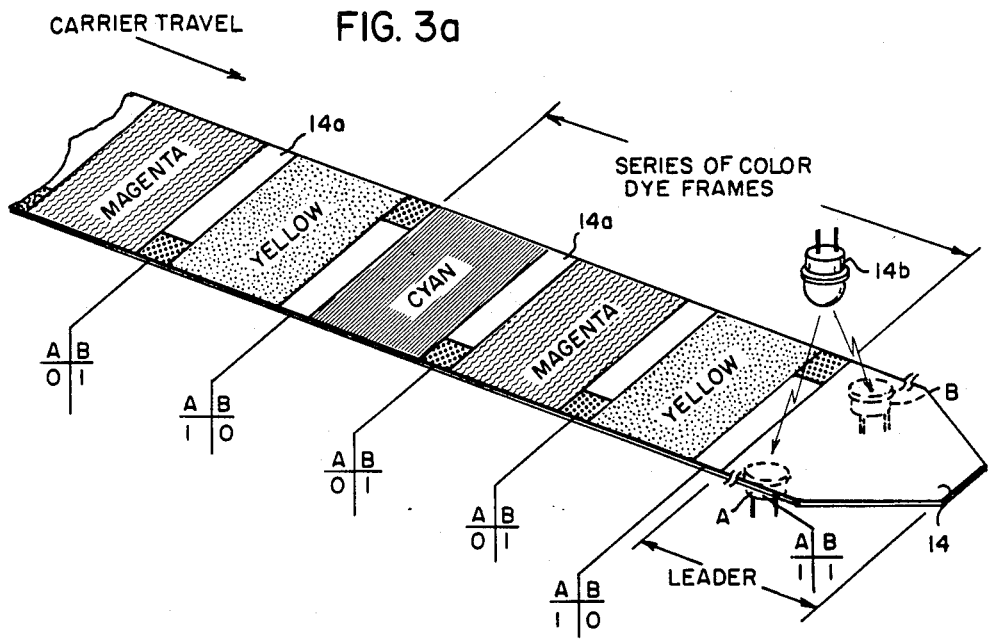

COLOR-INDEXED DYE FRAMES IN THERMAL PRINTERS

FIELD OF THE INVENTION

The present invention relates to thermal printers for printing color images which uses a carrier having a repeating series of spaced frames of different colored heat transferable dyes. More particularly, this invention relates to identifying the different color frames of each series.

BACKGROUND OF THE INVENTION

In one type of thermal printer which prints colored images, a carrier contains a repeating series of spaced frames of difference colored heat transferable dyes. In such apparatus, the carrier is disposed between a receiver, such as coated paper, and a print head formed of, for example, a plurality of individual heating elements. When a particular heating element is energized, it is heated and causes dye from the carrier to transfer to the receiver. The density or darkness of the printed color dye is a function of the energy delivered from the heating element to the carrier.

Thermal dye transfer printers offer the advantage of true "continuous tone" dye density transfer. This result is obtained by varying the energy applied to each heating element, yielding a variable dye density image pixel on the receiver.

The carrier often includes a repeating series of spaced yellow, magenta and cyan dye frames. First, the yellow frame and the receiver are moved to be positioned under the print head and as they are advanced, the heating elements are selectively energized to form a row of yellow image pixels in the receiver. This process is repeated until a yellow dye image is formed in the receiver. Next, the magenta frame is moved under the print head and the receiver is also moved under the print head. Both the receiver and the magenta frame are moved as the heating elements are selectively energized and a magenta image is formed superimposed upon the yellow image. Finally, as the cyan dye frame and the receiver are moved under the print head, the heating elements are selectively energized and a cyan dye image is formed in the receiver superimposed upon the yellow and magenta dye images. These yellow, magenta and cyan dye images combine to form a colored image. It has been found preferable to print the dye images in the order listed above; yellow, magenta and cyan. This results in the highest quality colored image being formed in the receiver.

Since the carrier has a repeating series of yellow, magenta and cyan dye frames, it is important to identify the leading yellow frame of each series. One way to identify the leading yellow frame is to employ a sensitometer. This sensitometer identifies a yellow dye frame by producing a particular analog signal in response to light which passes a yellow dye frame. Such sensitometer is effective but can be a complex and expensive piece of equipment. Another way to identify a yellow dye frame is to provide code marks. A code field composed of a series of black code bars can be disposed in the clear interframe area between dye frames. This code field can identify the particular color of the following frame. A reader station can be provided which includes a plurality of photodetectors which are aligned to produce a particular output signal representing the color of the following colored frame. Such a system can perform quite satisfactorily but requires complete decoding electronics and involves some manufacturing complexity for forming the code field in the clear interframe areas.

SUMMARY OF THE INVENTION

Accordingly, it is an object of this invention to provide an improved system for identifying the leading yellow dye frame of a repeating series of dye frames on a carrier as it is used in a thermal printer.

This object is achieved in a thermal printer system including a printer, a carrier with a repeating series of spaced yellow, magenta and cyan dye frames and which has clear interframe areas disposed between such dye frames, and a receiver which receives dye from the yellow, magenta and cyan frames of the series to form a colored image. Such printer includes a print heat having a plurality of selectively energizable heating elements, means for moving the carrier and the receiver respectively along paths so as to sequentially move each dye frame of a series and the receiver relative to the print head such that as the heating elements are selectively energized, dye from each dye frame of a series is transferred to the receiver and forms a colored image in the receiver. The carrier has a cyan dye patch disposed in a portion of the clear interframe area between a yellow dye frame of a series and the cyan dye frame of the preceding series, and the printer has means for decoding the cyan dye patch to identify the yellow dye frame of such series.

The decoding means includes a source of red light which is substantially absorbed by the code patch, and two photodetectors responsive to red light and disposed so that when one of them is adjacent to the code patch and receives no red light, the other is disposed adjacent to the clear interframe area and receives red light. The photodetectors produce logic signals which identify the following yellow dye frame.

An advantage of this invention is that low cost photodetectors are commercially available which are responsive to red light.

Another advantage is that the same dye which forms the cyan dye frame can be used for the cyan code patch.

BRIEF DESCRIPTION OF THE DRAWINGS

FIG. 2 is a perspective of several heating elements used in the print head of the apparatus of FIG. 1;

FIG. 3a shows a section of a typical carrier which can be used by the apparatus shown in FIG. 1, and logic tables for the photodetectors A and B in a reader station which are adapted to identify the different colored dye frames of a repeating series of dye frames in a carrier; and FIG. 3b shows a cross section of the carrier shown in FIG. 3a.

DESCRIPTION OF THE PREFERRED EMBODIMENT

Figure 1:
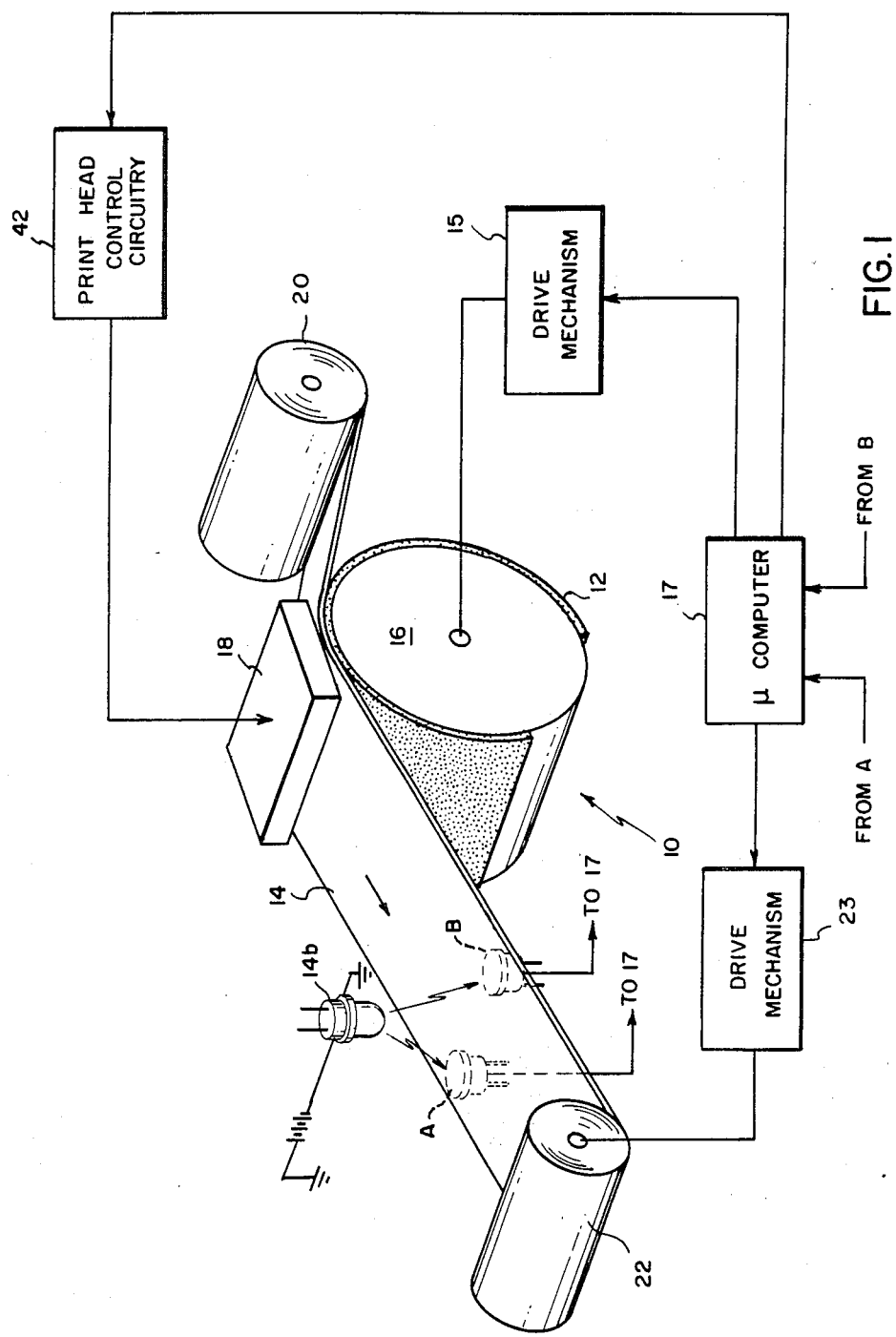
FIG. 1 is a schematic of a thermal printer apparatus which can be employed to make colored image in a receiver in accordance with the invention.

To facilitate an understanding of the present invention, reference is first made to FIG. 3a which shows a typical section of a strip of a carrier 14 which may be used in the printer 10 shown in FIG. 1. The carrier 14 comprises a strip having a clear leader portion followed by a repeating series of colored dye frames. The dye frames are spaced and each series includes in sequence yellow, magenta and cyan dye frames. Between each dye frame is a interframe area 14a which is clear except for a cyan code patch 14c. By clear is meant that this area is substantially transparent to light provided by an LED 14b. As will be described later, the LED 14b produces red light. Located in the printer 10 and shown schematically in FIG. 3a is a reader station which includes the LED 14b and two spaced photodetectors A and B respectively. These photodetectors A and B are adapted to decode the cyan code patch 14c in each interframe area and identify the particular color of the following dye frame. When the interframe area 14a preceding to a yellow dye frame is disposed adjacent to the photodetectors A and B, the photodetector B will be completely covered by a cyan dye patch 14c and the photodetector A will be disposed adjacent to the clear portion of the interframe area 14a. Red light produced by the LED 14b will only illuminate the photodetector A since the cyan patch 14c will absorb red light. When illuminated, a photodetector will be considered to provide a logic 1. Therefore as shown, photodetector A will produce a logic 1 and photodetector B will produce a logic 0 when the interframe area preceding a yellow dye frame is disposed adjacent to the photodetectors A and B. When the interframe area preceding either the magenta or cyan dye frames is disposed over the photodetectors A and B, then photodetector A will not be illuminated by light from LED 14b while photodetector B will be illuminated. Therefore, photodetector A will produce a logic 0 and photodetector B will produce a logic 1. The output of each photodetector is provided to circuitry in a microcomputer 17. The microcomputer 17 then determines the color of the following dye frame. The different logic pattern 1, 1, for the clear leader portion is also shown. The patterns in the interframe areas are also used by a microcomputer 17 to control the state of the printing cycle of a dye image in a manner as will be understood to those skilled in the art.

FIG. 3b shows in cross-section the carrier 14. As shown, the carrier 14 includes a support. On one surface of the support is a slipping layer which bears against the heating elements of a print head in printer 10 of FIG. 1. On the other surface of the support is a barrier layer. On the barrier layer is the dye layer. Heat from the heating element passes through the slipping, support and barrier layers to the dye layer. The dye is sublimed from this layer into a receiver member 12.

Referring to FIG. 1 where the printer 10 which uses the carrier 14 and also a receiver member 12 is shown. The receiver member 12, in the form of a sheet, is secured to a rotatable drum 16 which is mechanically coupled to a drive mechanism 15. It will be understood that the drive mechanism 15 continuously advances the drum 16 and receiver sheet 12 along a path past a stationary print head 18 during a cycle for addressing heating elements of the print head. Print head 18 has a plurality of heating elements 50, several of which are shown in FIG. 2, which press against the slipping layer of the carrier member 14 and force the carrier member against the receiver member 12. The carrier member 14 is driven along a path from a supply roller 20 onto a take-up roller 22 by a drive mechanism 23 coupled to the take-up roller 22. The drive mechanisms 15 and 23 each include motors which respectively continuously advance the carrier and the receiver relative to the heating elements of the print head as the heating elements are selectively energized.

The heating elements are shown schematically in FIG. 2. When a switch 54 is closed, a heating element 50 is connected to a potential source $V_S$. The microcomputer 17 controls the timing of the energization of the heating elements. During printing, as the members 12 and 14 are moved, dye image pixels are formed in the receiver member 12. As noted above, these members are moved continuously along paths relative to the print head during the printing operation. The microcomputer 17 controls the operation of the mechanisms 15 and 23.

The carrier member 14 is as noted above is formed with a repeating series of thermally transferable dye frames. Each series includes frames of yellow, magenta and cyan dye frames. The sequence of yellow, magenta and cyan is repeated. A single series is used to print one colored image in the receiver member 12. In the preferred embodiment, the dye is a material which transfers from the carrier to a receiver in response to energy applied by the individual heating elements of the print head 18.

In operation, after photodetectors A and B decode the logic pattern 1, 0, the microcomputer 17 causes the members 12 and 14 to move relative to the print head 18. The microcomputer 17 provides drive signals to the drive mechanism 15 to rotate the drum 16 to bring the receiver sheet 12 and the yellow dye frame under the print head 18. As the receiver member 12 moves past the print head 18, the selective energization of heating elements by the microcomputer 17 results in the printing of a yellow colored image on the receiver. After one complete frame of a yellow image has been printed, receiver 12 is returned to an initial home position adjacent to the print head 18. The microcomputer 17 in response to logic signals from photodetectors A and B causes the carrier 14 to move the magenta dye frame into position for printing. In response to logic pattern 0, 1 (see FIG. 3a) from photodetectors A and B, the microcomputer 17 causes the selective energization off the heating elements as the receiver and carrier are advanced. Thereafter, a magenta dye image is formed superimposed on the yellow dye image. Finally a cyan dye image is formed superimposed on the first two dye images to complete the colored image.

The invention has been described in detail with particular reference to a certain preferred embodiment thereof, but it will be understood that variations and modifications can be effected within the spirit and scope of the invention.

We claim:

1. In a thermal printer system including a printer, a carrier with a repeating series of spaced yellow, magenta and cyan dye frames and which has clear interframe areas disposed between such dye frames, and a receiver which receives dye from the yellow, magenta and cyan dye frames of a series to form a colored image, such printer including a print head having a plurality of selectively energizable heating elements, means for moving the carrier and the receiver along respective paths so as to sequentially move each dye frame of a series and the receiver relative to the print head such that as the heating elements are selectively energized, dye from each dye frame of a series is transferred to the receiver and forms a colored image in the receiver, the improvement comprising:

a. the carrier having a cyan dye patch disposed in a portion of the clear interframe between a yellow dye frame of a series and the cyan frame of the preceding series; and b. the printer having means for decoding the cyan patch to identify the yellow dye frame of such series.

2. The invention as set forth in claim 1, wherein said decoding means includes a source of red light which is substantially absorbed by the cyan dye patch; two photodetectors responsive to red light and disposed so that when one of them is disposed adjacent to the cyan dye patch and receives no red light, the other is disposed adjacent to the clear interframe area, and receives red light such that such photodetectors produce logic signals which identify the following yellow dye frame.

3. A carrier for use in a thermal printer includes a repeating series of spaced yellow, magenta and cyan dye frames having clear interframe areas disposed between dye frames, the improvement comprising:

a. a cyan code patch disposed in a portion of the clear interframe between a yellow frame of a series and the cyan frame of the preceding series, which permits the recognition of the yellow frame of this series.

4. The carrier set forth in claim 3, wherein the cyan code patch is composed of the same dye which forms the cyan dye frame.

5. The carrier set forth in claim 4, wherein a cyan code patch is disposed in the clear interframe area between the magenta and yellow dye frames of a series and in the interframe area between the cyan and magenta color frames.

6. In a thermal printer system including a printer, a carrier with a repeating series of at least three spaced dye frames, each such dye frame having a different dye, such carrier having a clear interframe areas disposed between such dye frames, and a receiver which receives dye from the dye frames of a series to form a colored image, such printer including a print head having a plurality of selectively energizable heating elements, means for moving the carrier and the receiver along respective paths so as to sequentially move each dye frame of a series and the receiver relative to the print head such that as the heating elements are selectively energized, dye from each dye frame of a series is transferred to the receiver and forms a colored image in the receiver, the improvement comprising:

a. the carrier having a dye patch disposed in a portion of the clear interframe between the first dye frame of a series and the last dye frame of the preceding series; and b. the printer having means for decoding such dye patch to identify the first dye frame of such series.

* * * * *